(12) United States Patent
Davis

(10) Patent No.: US 9,725,024 B1
(45) Date of Patent: Aug. 8, 2017

(54) TILTING FOLDING TRAILER

(71) Applicant: Russell T. Davis, Ft. Myers, FL (US)

(72) Inventor: Russell T. Davis, Ft. Myers, FL (US)

(*) Notice: Subject to any disclaimer, the term of this patent is extended or adjusted under 35 U.S.C. 154(b) by 59 days.

(21) Appl. No.: 14/645,664

(22) Filed: Mar. 12, 2015

Related U.S. Application Data

(63) Continuation-in-part of application No. 14/146,829, filed on Jan. 3, 2014, now abandoned.

(60) Provisional application No. 61/749,522, filed on Jan. 7, 2013.

(51) Int. Cl.
  *B60P 1/16* (2006.01)
  *B62D 63/06* (2006.01)
(52) U.S. Cl.
  CPC .............. *B60P 1/16* (2013.01); *B62D 63/061* (2013.01); *B62D 63/062* (2013.01)
(58) Field of Classification Search
  CPC ...... B62D 3/061; B62D 63/062; B62D 63/08; B62B 3/025; B60P 1/16
  USPC ...................... 280/639, 656, 415.1
  See application file for complete search history.

(56) References Cited

U.S. PATENT DOCUMENTS

| | | | |
|---|---|---|---|
| 3,102,738 A * | 9/1963 | De Roshia | B60P 1/6418 280/149.2 |
| 4,239,258 A * | 12/1980 | Burris | B62D 63/061 280/639 |
| 4,335,901 A | 6/1982 | Gladish | |
| 4,786,073 A * | 11/1988 | Harper | B62D 63/061 280/491.1 |
| 4,934,733 A | 6/1990 | Smith et al. | |
| 5,275,430 A | 1/1994 | Smith | |
| 5,560,639 A | 10/1996 | Nowell et al. | |
| 5,951,032 A * | 9/1999 | Overby | B60G 7/02 280/124.116 |
| 7,281,728 B1 * | 10/2007 | Wayrynen | B60P 3/1066 280/124.158 |
| 7,537,219 B1 | 5/2009 | Sherwood | |
| 7,540,528 B2 | 6/2009 | Spainhower | |
| 7,891,697 B1 * | 2/2011 | Fahrbach | B62D 63/061 280/656 |
| 7,909,355 B2 | 3/2011 | Thedford et al. | |
| 2010/0289250 A1 * | 11/2010 | Fankhauser | B60G 3/14 280/490.1 |

* cited by examiner

*Primary Examiner* — Michael McCullough
*Assistant Examiner* — Ashley Romano
(74) *Attorney, Agent, or Firm* — Philip L. Bateman

(57) ABSTRACT

A trailer has a three-section flat bed in which the front and rear sections fold onto the middle section. The trailer has an airbag suspension system and one wheel on each side. When the airbags are deflated, the entire flat bed forms a ramp for loading and unloading. When the airbags are deflated and the flat bed is folded, the trailer can be stored vertically while resting on its wheels.

5 Claims, 6 Drawing Sheets

TILTING FOLDING TRAILER

CROSS-REFERENCE TO RELATED APPLICATIONS

This application is a continuation in part of U.S. application Ser. No. 14/146,829, Jan. 3, 2014, that claims the benefit of U.S. Provisional Application Ser. No. 61/749,522, Jan. 7, 2013.

FIELD OF THE INVENTION

This invention relates to land vehicles. More particularly, this invention relates to trailers.

BACKGROUND OF THE INVENTION

A trailer is an unpowered wheeled vehicle that is used for hauling cargo. The surface upon which the cargo rests is most commonly known as the bed, but is also known as the deck or the platform. Trailers having an uncovered flat bed are used to transport motorcycles, lawn tractors, all terrain vehicles, watercraft, and other personal cargo. Flat bed trailers typically contain tongues with couplers that attach to a trailer hitch mounted on the back end of an automobile or truck.

Flat bed trailers typically include a suspension system to dampen the movement of the bed as the wheels pass over uneven surfaces. Suspension systems typically include coil springs, shock absorbers, or struts that are mounted between the components that support the wheels and the bed. Suspension systems containing airbags have also been disclosed. For example, Gladish, U.S. Pat. No. 4,335,901, Jun. 22, 1982; Smith et al., U.S. Pat. No. 4,934,733, Jun. 19, 1990; Smith, U.S. Pat. No. 5,275,430, Jan. 4, 1994; and Sherwood, U.S. Pat. No. 7,537,219, May 26, 2009; disclose air bag suspension systems.

Flat bed trailers are relatively bulky and take up considerable storage space when not in use, when on display at retail stores, and when shipped from the point of manufacture to the point of sale. To reduce the storage space, trailers having folding beds have been disclosed. For example, Spainhower, U.S. Pat. No. 7,540,528, Jun. 2, 2009, and Fahrbach, U.S. Pat. No. 7,891,697, Feb. 22, 2011, disclose folding flat bed trailers. When folded, the Spainhower trailer forms a compact vertical assembly that rests on a support base on rollers.

The bed of a flat bed trailer must be high enough above the ground to provide adequate clearance when the trailer is towed. Light weight cargo can be lifted up manually from the ground onto the bed, but other means must be used to load heavy wheeled cargo such as motorcycles, lawn tractors, and all terrain vehicles. One method is to employ a powered lifting device such as a fork lift truck. However, fork lift trucks are rarely available for personal use. A second method is to load and unload the trailer from an elevated platform such as a loading dock. Again, elevated platforms are rarely available for personal use. A third method is to use a ramp consisting of long wood or metal planks between the bed and the ground. Ramps are prone to loss and must be secured onto the trailer during transport. A fourth method, as disclosed in Thedford et al, U.S. Pat. No. 7,909,355, Mar. 22, 2011, is to include a folding section as part of the bed of the trailer. The folding section is lowered to the ground for loading or unloading and is raised during transport. The folding section of the Thedford et al. trailer forms a relatively steep angle to the ground because of its dimensions. Nowell et al., U.S. Pat. No. 5,560,639, Oct. 1, 1996, disclose a four-wheeled trailer having an airbag suspension on the rear pair of wheels that, when the airbags are deflated, allows the entire bed of the trailer to lower and tilt toward the rear. The entire bed thus forms a ramp upon which the cargo can be loaded. The bed of the Nowell trailer telescopes, but does not fold for storage. Fankhauser et al., U.S. Pat. Appln. Publn. No. 2010/0289250, Nov. 18, 2010, discloses a two-wheeled trailer having an airbag suspension that, when the airbags are deflated, allows the entire bed of the trailer to lower. The Fankhauser trailer does not fold for storage.

Accordingly, there is a demand for an improved trailer with an airbag suspension that, when the airbags are deflated, allows the entire bed to tilt toward the rear to form a ramp for loading (and unloading), and that folds for compact vertical storage on its wheels.

SUMMARY OF THE INVENTION

The general object of this invention is to provide an improved trailer with an airbag suspension that, when the airbags are deflated, allows the entire bed to tilt toward the rear to form a ramp for loading, and that folds for compact vertical storage on its wheels.

I have invented an improved trailer. The trailer comprises: (a) a flat bed; (b) a tongue with a coupler and a hinge; (c) a suspension system on each side; and (d) a wheel on each side. In more detail, the flat bed comprises: (i) a flat front section having a transverse front edge and a transverse rear edge; (ii) a flat middle section having a transverse front edge, a transverse rear edge, and two sides; (iii) a flat rear section having a transverse front edge and a transverse rear edge; (iv) a first hinge connecting the rear edge of the front section and the front edge of the middle section, the first hinge having a 180 degree of travel such that the front section is foldable upon the middle section; and (v) a second hinge connecting the rear edge of the middle section and the front edge of the rear section, the second hinge having a 180 degree of travel such that the rear section is foldable upon the middle section;

The tongue has a forward end with a coupler for attachment to a towing vehicle. The tongue has an opposed end with a hinge connecting the opposed end of the tongue and the front edge of the front section of the flat bed. The tongue hinge has a 180 degree of travel such that the tongue is foldable upon the front section.

The suspension system has two sides connected to the middle section. The suspension system is completely behind the front edge of the middle section and completely forward of the rear edge of the middle section. Each side of the suspension system comprises: (i) a platform rotatably attached to the side of the middle section of the bed; (ii) an inflatable/deflatable airbag positioned between the platform and the middle section of the bed; (iii) a riser attached to the platform; and (iv) an outwardly extending axle attached to the riser, the axle defining a horizontal plane that is above the platform. When the airbags are deflated the flat bed lowers and tilts with the middle section of the flat bed below the horizontal plane defined by the axles A wheel is attached to the axle of each side of the suspension system. Each wheel has a rearward outer edge defining a vertical plane that is closely aligned with the rear edge of the middle section when the trailer is in an operating position with the airbags inflated such that the bottom outer edge of the wheel is closely aligned with the rear edge of the middle section when the trailer is in a folded storage position with the three sections of the bed and the tongue in a vertical orientation.

The trailer of this invention tilts toward the rear to form a ramp for easy loading (and unloading) when the airbags are deflated. The trailer also folds for compact vertical storage.

DETAILED DESCRIPTION OF THE INVENTION

1. The Invention in General

Figure 1:
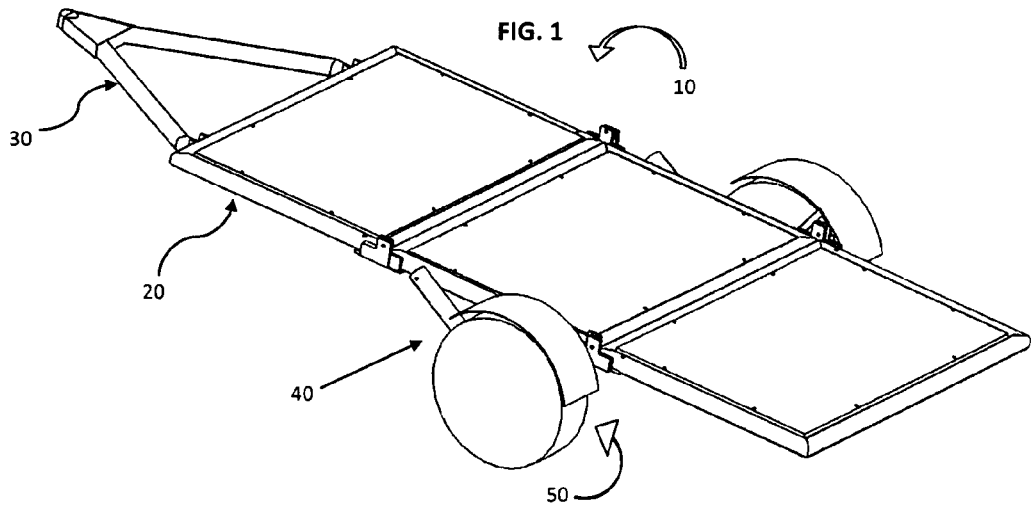
FIG. 1 is a perspective view of a preferred embodiment of the trailer of this invention in an operating position.
Figure 2:
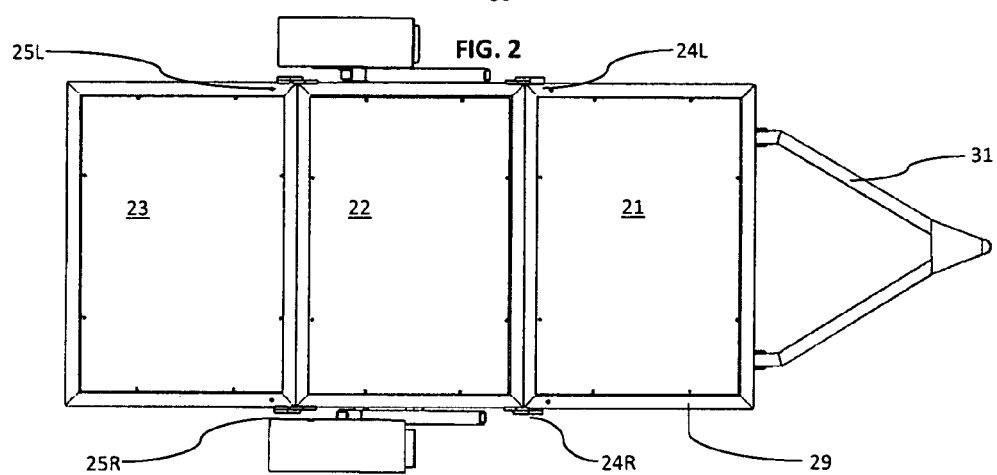
FIG. 2 is a top plan view thereof.
Figure 3:
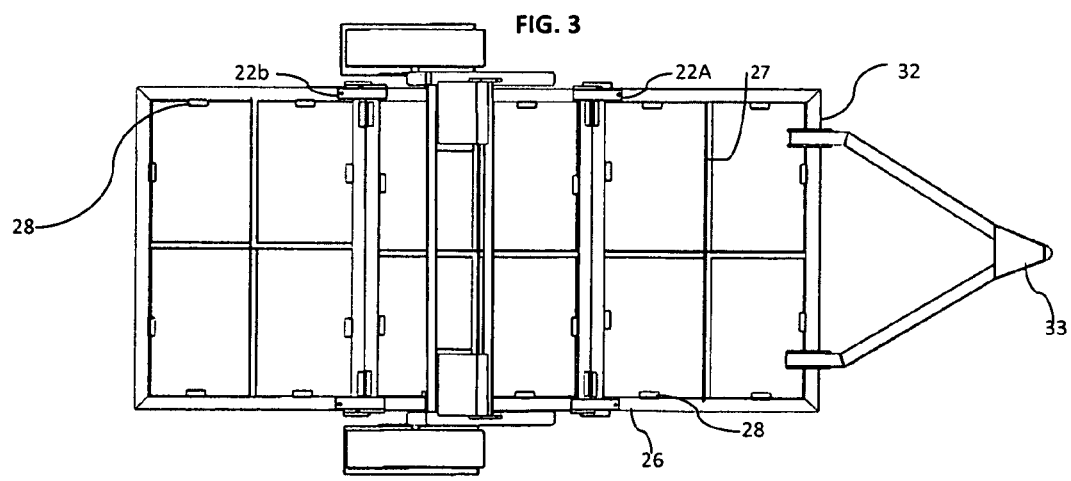
FIG. 3 is a bottom plan view thereof.

This invention is best understood by reference to the drawings. Referring first to FIGS. 1 to 3, the trailer 10 of this invention comprises a flat bed 20 with two sides, a tongue 30, a suspension system 40 with two sides, and a wheel 50 attached to each side of the suspension system. The components are discussed in more detail below.

2. The Flat Bed

The flat bed 20 comprises three sections—a front section 21, a middle section 22, and a rear section 23. The front section is connected to the middle section by a first hinge. In the embodiment shown, the first hinge consists of two separate hinges—hinge 24R on the right side and hinge 24L the left side. The middle section is connected to the rear section by a second hinge. In the embodiment shown, the second hinge consists of two separate hinges—hinge 25R on the right side and hinge 25L the left side. The second hinge enables the rear section to fold upon the middle section. The first hinge enables the front section to fold upon the middle section and upon the folded rear section.

The three sections preferably have the same or similar dimensions so that the size of the bed in the folded position is minimized for a given unfolded size. For example, if the trailer has a length of nine feet (not including the tongue), the folded size is minimized if each section has a length of about three feet (one-third of nine feet). The trailer is generally about six to twelve feet in length (not including the tongue) and about three to six feet in width.

The trailer sections are made of a durable material such as metal, wood, or a combination of the two. The three sections of the preferred embodiment are made of wooden sheets lying within a metal frame 26. The three frames preferably include cross members 27 that provide additional strength. Each wooden sheet lies in a recess having a depth that is generally about three-fourths to one inch. This depth corresponds to the thickness of the wooden sheets so that the top of the wooden sheets are flush with the top of the metal frame. The interiors of the frames contain multiple support brackets 28 upon which the wooden sheets lie. Vertically oriented fasteners 29, such as screws, nuts and bolts, or the like, are used to attach the wooden sheets to the brackets.

Figure 12:
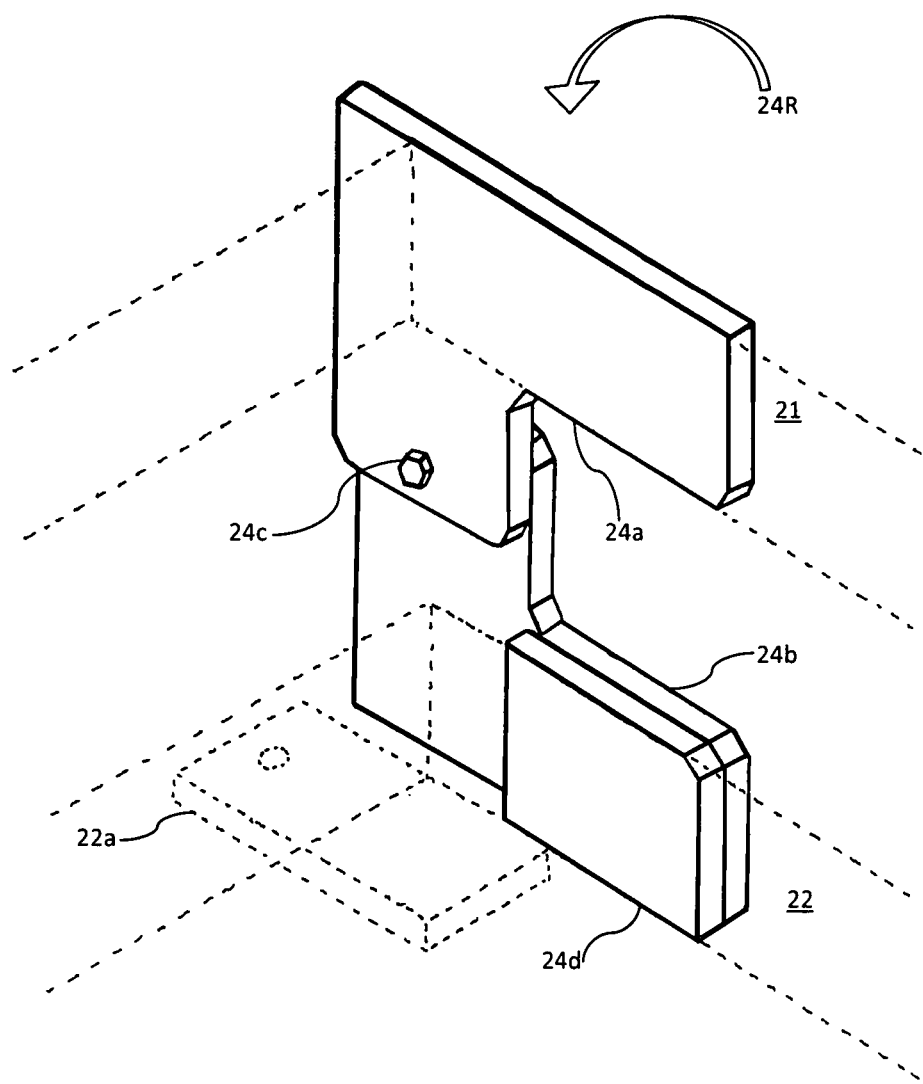
FIG. 12 is a left side perspective view of the right side first hinge in the folded storage position.
Figure 15:
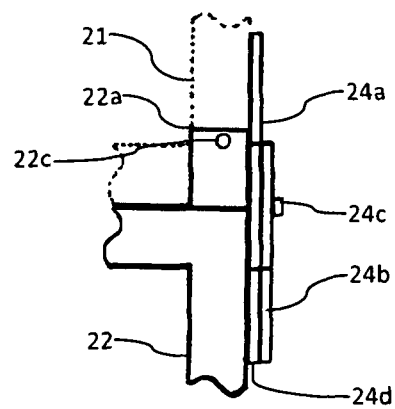
FIG. 15 is a top plan view of the right side hinge is the operating position.
Figure 14:
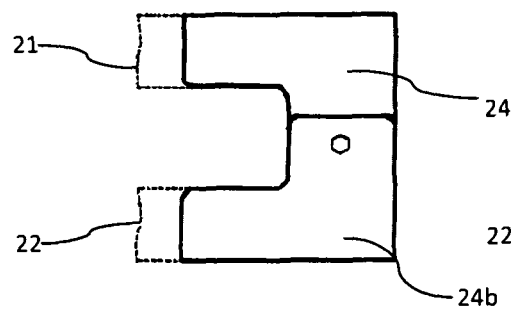
FIG. 14 is a right side elevation view thereof.
Figure 16:
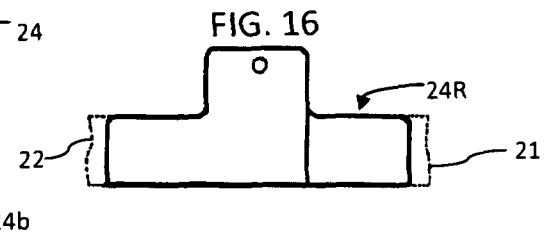
FIG. 16 is a right side elevation view thereof.

In the preferred embodiment, the middle section contains two tabs 22a projecting forward from its front edge and two tabs 22b projecting rearwardly from its rear edge. The tabs are best seen in FIGS. 3, 12, and 15. The upper surfaces of the tabs are aligned with the lower surface of the sections. The front section and the rear sections sit upon the tabs when the trailer is in the unfolded, operating position. The tabs thus help keep the sections of the trailers in a parallel position. In the preferred embodiment, the forward projecting tabs and the front section of the bed have aligned holes 22c that accommodate nuts and bolts to secure the sections in the parallel, unfolded, operating position. The rearward projecting tabs and the rear section preferably have similar aligned holes.

In the preferred embodiment, the wooden bed of each section comprises a sheet of three-fourths to one inch thick plywood having a width of four feet and a length of about 31 and ⅞ inches. These dimensions enable the three bed sections to be cut from a single sheet of four by eight foot plywood with an allowance of one eighth inch for each kerf (width of the saw cut). Four by eight foot sheets of plywood are widely available in many different thicknesses and grades.

The hinges are shown in detail in FIGS. 12 to 18. The front section and the middle section are shown in phantom lines for illustration purposes. Referring first to FIG. 12, first hinge 24R on the right side is shown in the folded storage position. The hinge comprises two "L" shaped members, front member 24a and rear member 24b that pivot relative to each other about bolt 24c. The front member and rear member have multiple beveled corners to allow them to pivot. The rear member has a block 24d on its inner side against which the front member abuts when the trailer is in the unfolded, operating position. The block thus helps keep the sections of the trailers in a parallel position. The right side first hinge is shown in other views in the folded storage position in FIGS. 13 and 14. The right side first hinge is shown in the operating position in FIGS. 15 and 16. First hinge 24L on the left side is substantially a mirror image of hinge 24R on the right side.

Figure 17:
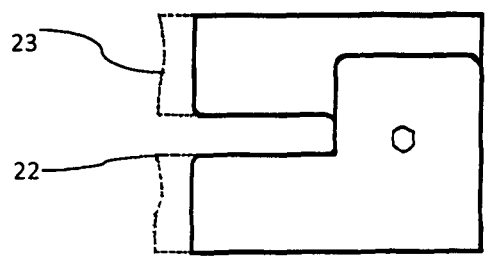
FIG. 17 is a left side elevation view of the left side second hinge in the folded storage position.
Figure 18:
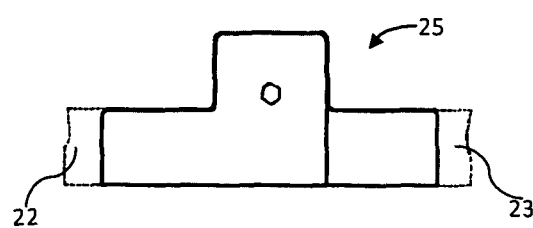
FIG. 18 is a left side elevation view of the left side second hinge in the operating position.

Second hinge 25L is shown in detail in FIGS. 17 and 18. The second hinges are similar to the first hinges except that they pivot about slightly lower axes. The first hinges pivot about a higher axis than the second hinges to enable the front section to elevate sufficiently to fold upon both the middle section and the rear section. The right and left side second hinges are substantially mirror images of each other. The first and second hinges are attached to the sections of the bed by welding or with the use of fasteners.

3. The Tongue

The tongue 30 of the preferred embodiment contains two converging members 31 that are attached to the front edge of the front section of the flat bed at hinges 32. The two members converge at a coupler 33 that attaches to a trailer hitch. A wide variety of couplers and hitches are well known in the art. For personal use, the most common hitch is the ball type. As explained in detail below, the tongue hinges preferably enable the tongue to pivot 180 degrees about a transverse horizontal axis. If desired, the tongue contains a single member that is attached to a single hinge on the front edge of the first section of the flat bed.

4. The Suspension System and Wheels

A suspension system 40 is connected to the middle section of the flat bed. As best seen in FIGS. 2 and 3, the suspension system is completely behind the front edge of the middle section and completely forward of the rear edge of the middle section. The suspension system is thus completely within the length of the middle section and adds nothing to the height of the trailer when folded and stored in the vertical position. This structure enables the trailer to be folded compactly, as described in more detail below.

The suspension system has two sides, one located on each side of the trailer. The sides of the suspension system are substantially mirror images. For reasons explained below, each side of the suspension system is positioned on the middle section so that the rear of each wheel is in vertical alignment with the rear edge of the middle section when the trailer is in the operating (towing) position shown in FIG. 1.

Figure 4:
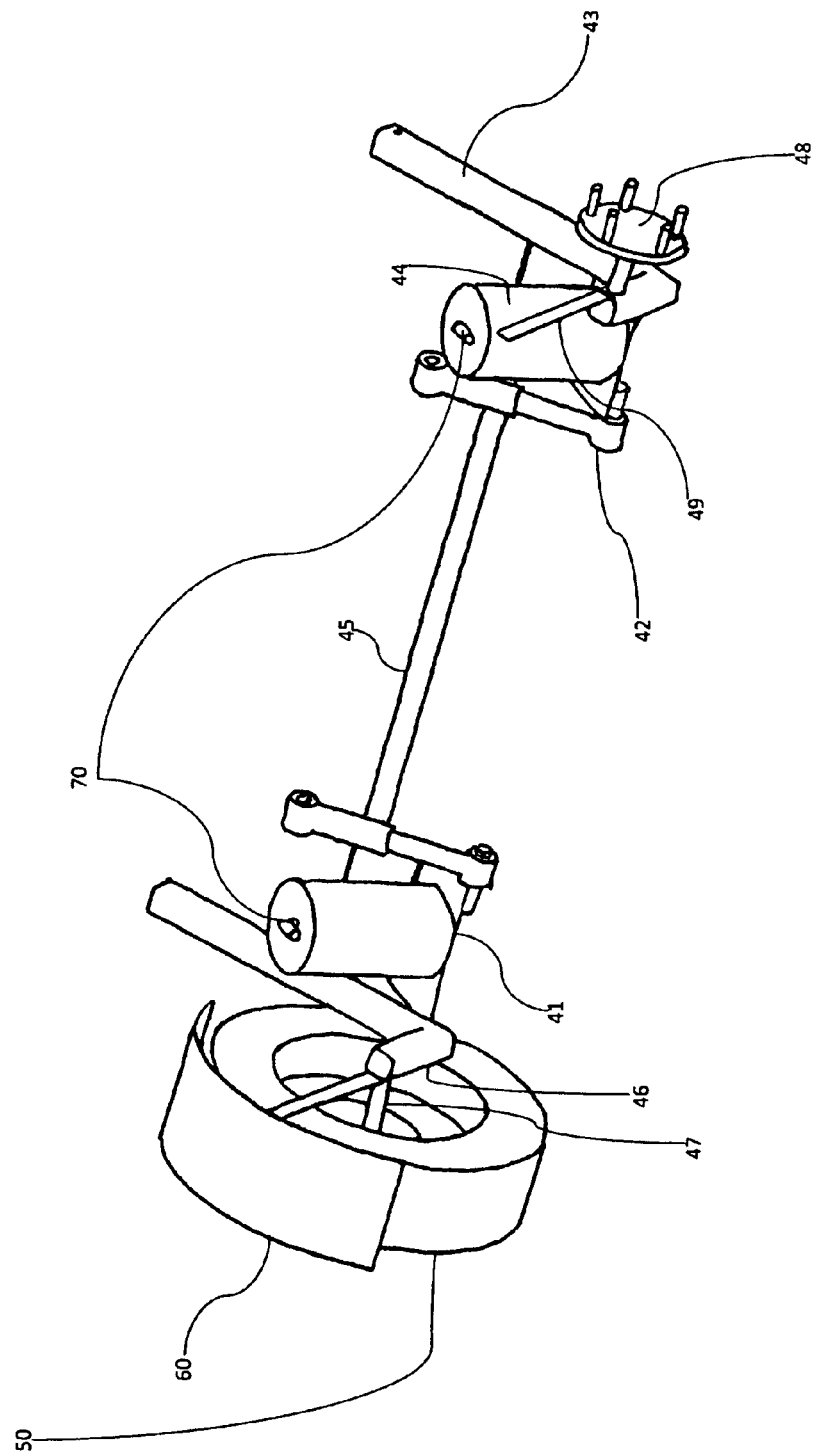
FIG. 4 is a detail perspective view of the airbag suspension components thereof.

Referring now to FIG. 4, each side of the suspension system contains a platform 41 that is rotatably attached to the middle section of the flat bed. The term "rotatably attached" means that the platform can rotate, or swivel, with respect to the middle section. The platforms are below (closer to the ground) than the axles. As explained in more detail below, this structure enables the entire bed to lower close to the ground when the airbags are deflated. In the preferred embodiment, each platform is connected to the middle section by means of an inner shock absorber 42, an outer rigid arm 43, and an airbag 44. Each shock absorber further dampens movement of the bed during transport. Each shock absorber has an upper sleeve for attachment with a pin to the middle section and has a lower sleeve for attachment with a pin to the platform. The outer rigid arm has openings at its top for attachment of a pin to the middle section. It can be appreciated that the sides of the suspension systems rotate about the pin attaching the top of the outer rigid arm.

A cross member 45 preferably connects the platforms which, in turn, links the left side and right sides of the suspension system. Linking the left side and right side sides of the suspension system provides additional dampening.

Each airbag is sandwiched (mounted) between the middle section of the bed and each platform. In the preferred embodiment, a mounting bracket is attached to the underside of the middle section and the top of the airbag is attached to this mounting bracket. The airbag is conventional and can be inflated or deflated through valved air lines 70. Inflation can be accomplished by connection to an air compressor or other source of compressed air, such as a compressed air tank or canister. Deflation is accomplished by opening the valve in the air line and venting to the atmosphere.

A riser 46 is connected to the platform. The structure of the riser is a matter of choice. In the preferred embodiment, the riser is a section of square tube (also known as square channel). The riser is connected to and supports an outwardly extending non-rotating axle 47. The axle is connected to a spindle 48 having outwardly extending lug bolts. The spindle rotates freely on the axle and includes bearings or the like as desired to reduce friction between it and the axle. In the preferred embodiment, a fender support member 49 extends upwardly from the riser.

A wheel 50 is attached to each spindle by fastening lug nuts onto the lug bolts of the spindle. The wheels are conventional rubber tires on metal rims. As mentioned above, the wheels have a diameter such that their rearward surfaces are aligned with the rear edge of the middle section. In the preferred embodiment, a fender 60 is attached to the fender support member. The fenders contain upward splatter of water and dirt and thus help keep the top of the bed and the cargo clean.

It can be appreciated that this suspension system allows the platforms and wheels to move relative to the flat bed, which movement is dampened by the airbags and the shock absorbers. The amount of the dampening can be varied by adjusting the inflation of the airbags. The amount of the dampening can also be varied by adjusting the shock absorbers if they are of the adjustable type.

5. Optional Components

A variety of optional components are included with the trailer. One class of optional components are devices for inflating the airbags, such as air compressors and compressed air tanks or canisters. Another class of optional components are devices for securing cargo on the flat bed, such as chocks, tie-downs, poles, barriers, nets, fencing, and the like.

6. Uses

Figure 5:
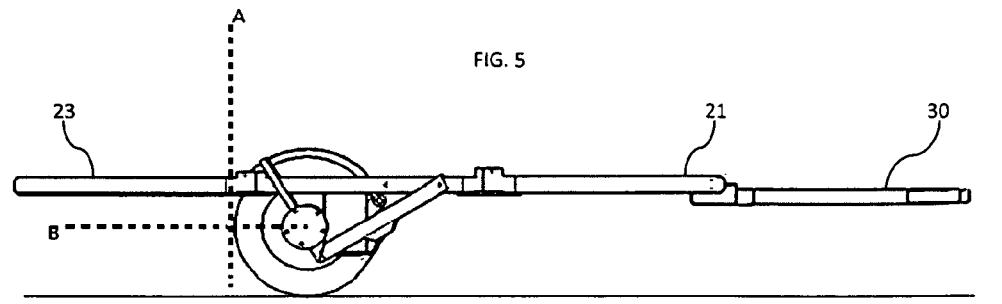
FIG. 5 is a side elevation view of the preferred embodiment of the trailer in the raised, operating position.

The trailer of this invention is used in the same manner as conventional flat bed trailers when in its unfolded, operating, towing position with both airbags inflated and with the bed in a substantially horizontal orientation as shown in FIG. 5. The vertical broken line A indicates that the rear edge of the second hinge and the rearward outer edges of the wheels are closely aligned in the same vertical plane. The horizontal broken line B indicates the horizontal plane defined by the axles. It can be seen that the platforms of the suspension system are below this horizontal plane. The wheel on the near side is omitted for illustration purposes in FIGS. 5 to 11.

Figure 6:
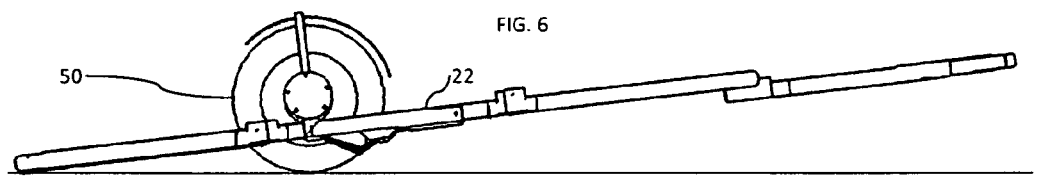
FIG. 6 is a side elevation view thereof in the lowered, tilted position for loading and unloading.

Referring now to FIG. 6, the entire flat bed tilts to form a ramp when the airbags are deflated. The formation of a ramp eases loading and unloading and eliminates the need for separate ramps or for the use of a loading dock or a lifting device. The bed forms a relatively small angle to the horizontal that enables cargo having small ground clearances to be loaded and unloaded with ease.

Figure 7:
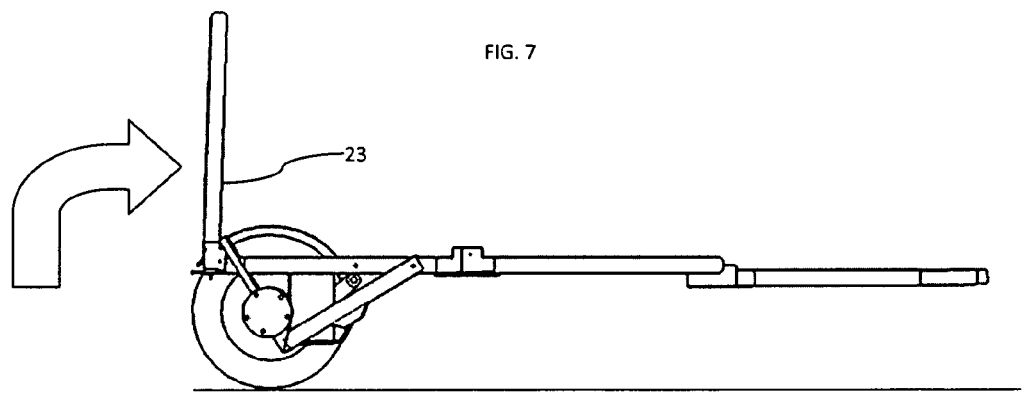
FIG. 7 is a side elevation view thereof showing a first folding step.
Figure 8:
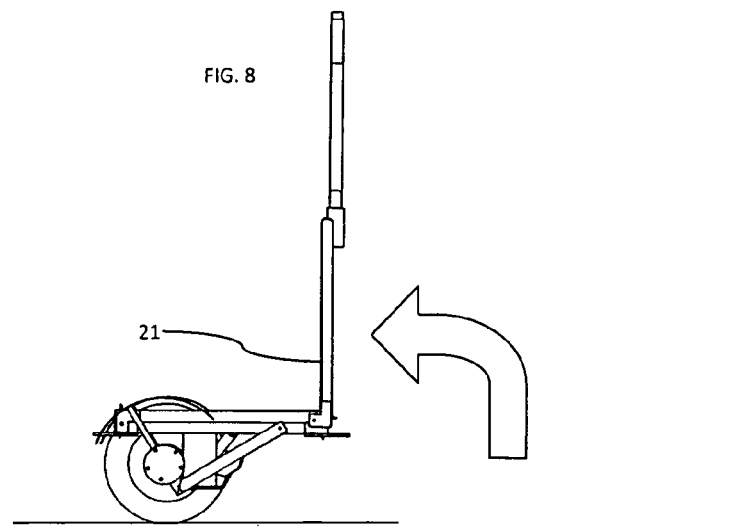
FIG. 8 is a side elevation view thereof showing a second folding step.
Figure 9:
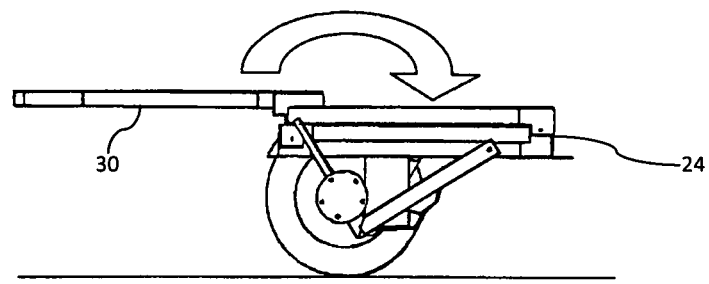
FIG. 9 is a side elevation view thereof showing a third folding step.
Figure 10:
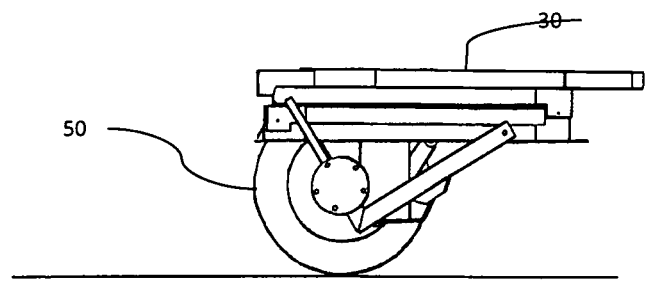
FIG. 10 is a side elevation view thereof showing a fourth folding step.
Figure 13:
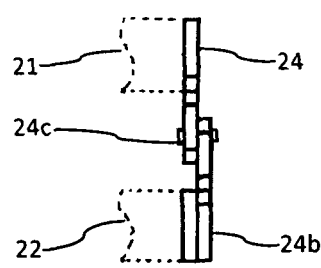
FIG. 13 is a rear elevation view thereof.

As previously discussed, the trailer is foldable for storage. The trailer is also conveniently folded for display at retail locations and when shipped (for example, from a point of manufacture to a point of sale). When the trailer is to be folded, the airbags can be inflated or deflated. The rear section is first folded over onto the middle section, as shown in FIGS. 7 and 8. The front section is then folded over onto the middle and rear sections, as shown in FIGS. 8, 9, and 13. The tongue is then pivoted 180 degrees about a transverse horizontal axis as shown in FIGS. 9 and 10.

Figure 11:
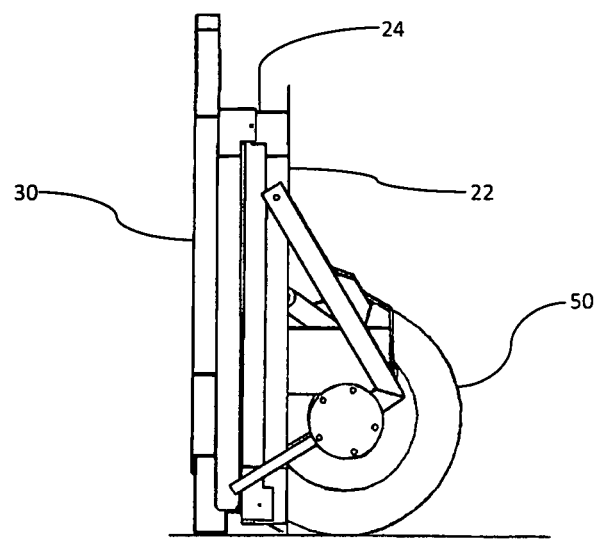
FIG. 11 is a side elevation view thereof showing the vertical folded storage position.

The entire folded assembly is then rotated 90 degrees so the trailer sections are vertical with the wheels positioned on the ground as shown in FIG. 11. It can be seen that the rear edge of the middle section and the bottom outer edges of the wheels are closely aligned in the same horizontal plane (the plane defined by the ground), thus enabling the folded trailer assembly to be stored in a stable, vertical position. It can also be seen that the overall height of the folded trailer assembly shown is equal to the length of the tongue. If the minimal overall height is desired, the length of the tongue is decreased to about the overall length of the three folding sections of the bed. As discussed above, this length is generally less than about three feet. The folded trailer assembly is easily moved as desired by rocking it back slightly to elevate the hinge off the ground so that only the wheels make contact with the ground. There is no need for separate rollers, wheels, casters, or the like to ease movement.

I claim:

1. A flat bed trailer having an operating position in which the bed is substantially horizontal, a loading position in which the bed is tilted, and a folded storage position in which the bed is substantially vertical, the trailer comprising:
   (a) a flat bed comprising: (i) a flat front section having a transverse front edge and a transverse rear edge; (ii) a flat middle section having a transverse front edge, a transverse rear edge, and two sides; (iii) a flat rear section having a transverse front edge and a transverse rear edge; (iv) a first hinge connecting the rear edge of the front section and the front edge of the middle section, the first hinge having a 180 degree of travel such that the front section is foldable upon the middle section; and (v) a second hinge connecting the rear edge of the middle section and the front edge of the rear section, the second hinge having a 180 degree of travel such that the rear section is foldable upon the middle section;
   (b) a tongue having a forward end with a downwardly facing coupler for attachment to a towing vehicle and having an opposed end with a hinge connected to the front edge of the front section of the flat bed, the tongue hinge having a 180 degree of travel such that the tongue is foldable upon the front section with the coupler facing downwardly when the front section is folded upon the middle section;
   (c) a suspension system having two sides connected to the middle section of the bed with the two sides connected to each other by a cross member, the suspension system being completely behind the front edge of the middle section and completely forward of the rear edge of the middle section, each side of the suspension system comprising: (i) a platform rotatably attached to the middle section with a rigid arm and a shock absorber; (ii) an inflatable/deflatable airbag positioned between the platform and the middle section; (iii) a riser attached to the platform; and (iv) an outwardly extending axle attached to the riser, the axle defining a horizontal plane that is above the platform; such that the rigid arm forms a lever having at one end a pivoting point at the middle section of the bed and having the airbag, riser, and axle at an opposite end, such that when the airbags are inflated the middle section of the flat bed is above the horizontal plane defined by the axles and when the airbags are deflated the flat bed lowers and tilts with the middle section of the flat bed below the horizontal plane defined by the axles; and
   (d) a wheel attached to the axle of each side of the suspension system, each wheel having a rearward outer edge defining a vertical plane that is closely aligned with the rear edge of the middle section when the trailer is in an operating position with the airbags inflated such that the bottom outer edge of the wheel is closely aligned with the rear edge of the middle section when the trailer is in a folded storage position with the three sections of the bed and the tongue in a vertical orientation.

2. The trailer of claim 1 additionally comprising a valved air line communicating with each airbag.

3. The trailer of claim 2 additionally comprising an air compressor and/or an air tank for inflating the airbags.

4. The trailer of claim 1 wherein the flat bed sections comprise wooden sheets in metal frames.

5. The trailer of claim 1 wherein the front section, the middle section, and the rear section of the bed are substantially the same size.

* * * * *